United States Patent [19]

Lane

[11] Patent Number: 4,855,664
[45] Date of Patent: Aug. 8, 1989

[54] METHOD AND APPARATUS FOR DAMPING OSCILLATIONS OF AN AC GENERATOR

[75] Inventor: Lawrence J. Lane, Salem, Va.

[73] Assignee: General Electric Company, Salem, Va.

[21] Appl. No.: 204,817

[22] Filed: Jun. 10, 1988

[51] Int. Cl.$^4$ .......................... H02H 7/06; H02P 9/00
[52] U.S. Cl. ........................................ 322/19; 322/25; 322/58
[58] Field of Search ............................. 322/19, 25, 58

[56] References Cited

U.S. PATENT DOCUMENTS

| | | | |
|---|---|---|---|
| 4,125,884 | 11/1978 | Sun | 322/58 X |
| 4,329,637 | 5/1982 | Kotake et al. | 322/58 X |
| 4,393,345 | 7/1983 | Fork et al. | 322/58 X |
| 4,463,306 | 7/1984 | deMello et al. | 322/25 |
| 4,701,689 | 10/1987 | Yuan et al. | 322/58 X |
| 4,741,023 | 4/1988 | Lawson | 379/106 |

OTHER PUBLICATIONS

F. E. Terman–"Radio Engineering", McGraw-Hill, 1947, pp. 467–483.
F. E. Terman–"Radio Engineers Handbook", McGraw-Hill, 1943, pp. 531–553.
Graeme, Tobey, Huelsman–"Operational Amplifiers", McGraw-Hill 1971, Lib. Congress Cat. Card No. 74-163297, pp. 397, 398, 426.

Primary Examiner—R. J. Hickey
Attorney, Agent, or Firm—Arnold E. Renner

[57] ABSTRACT

A scheme for stabilizing a synchronous alternating current generator through the excitation control to dampen generator oscillations includes a power system stabilizer responsive to signals representing the generator output voltage and output current to provide an oscillation signal which represents the instantaneous magnitude of the generator oscillations. A modulator means is included which develops a signal, representing the generator voltage with respect to neutral, and this latter signal is multiplied by the oscillation signal to provide a control signal which controls the excitation of the generator.

19 Claims, 5 Drawing Sheets

METHOD AND APPARATUS FOR DAMPING OSCILLATIONS OF AN AC GENERATOR

BACKGROUND OF THE INVENTION

The present invention relates generally to the stabilizing of an alternating current (ac) synchronous generator and more particularly to the damping of oscillations of a synchronous generator.

In large ac power networks, the speeds of the several ac generators connected thereto can oscillate about the base system frequency (e.g., 60 hertz). As such, although the average system frequency is constant, some generators may be running above synchronous speed while, simultaneously, other generators are running below synchronous speed. The speed of a given generator can oscillate above or below its synchronous speeds such that its period of oscillation is in the approximate range of 0.2 to 2.0 seconds. Since, at a given instant, the generators may be running at different speeds and are, consequentially, generating different frequencies, appreciable voltages can exist across any connecting impedance such as the transmission lines, transformers, etc. These voltages can, in turn, result in excessive currents which may cause circuit breakers to open and thus interrupt electric service to users of electric power. It has, therefore, been customary and desirable to provide some means to dampen the oscillations in generator speed to enhance reliability of electric service.

Damping of the generator oscillations in a large power system is typically provided by what is called a power system stabilizer (PSS). A PSS is an auxiliary control device used in conjunction with the generator excitation system. The details and operation of a power system stabilizer are well known to those skilled in the art and the various types are presently in use. In general, however, the PSS senses generator terminal voltage and terminal current and in response thereto produces a signal which represents the instantaneous magnitude of the generator oscillations which latter signal is used to control the generator excitation such that a damping torque is applied to the generator rotor. Examples of systems employing a PSS include U.S. Pat. No. 4,741,023 "On-Line Test and Diagnostic System for Power System Stabilizer" by Rodney A. Lawson and U.S. Pat. No. 4,463,306 "System for Stabilizing Synchronous Machines" by F. P. de Mello et al. and reference may be had to these patents, which are hereby incorporated by reference, for further explanation as to the details of a PSS.

Typically, the field winding of the generator is energized by an exciter which is under the control of an automatic voltage regulator. In many of these systems, the output signal of the PSS is fed to a summing point within the voltage regulator and serves to modulate the voltage regulator output to control generator oscillations. In some voltage regulators, however, there either is no such summing point or it may be inaccessible to outside signals. For those types of voltage regulators where the PSS signals cannot be directly applied, it is known that the appropriate signal can be injected by means of a modulator. An example of such modulator is found in the de Mello et al. patent previously cited. The modulator in that patent consists of an autotransformer having taps which are selected by solid state switches. These switches are controlled by the PSS output signals. The system of the de Mello et al. patent suffers from a major drawback in that, because of the tap switching, the output is a step function rather than being continuously variable. In addition, the requirement for a large number of switches, even though solid state, adds degrees of complexity and potential failure points to the overall system.

SUMMARY OF THE INVENTION

It is, therefore, an object of the present invention to provide an improved method and apparatus for stabilizing oscillations of an ac generator.

It is a further object to provide a scheme for the stabilization of oscillations of a synchronous generator, in a system employing a power system stabilizer, by modulating a generator output voltage, with respect to neutral, by the power system stabilizer output and controlling the generator excitation as a function of that modified output.

It is another object to modify the output of a power system stabilizer as a function of a generator output voltage, with respect to neutral, and to use that modified power system stabilizer output to control the excitation of the generator.

It is an additional object to provide a scheme which is broadly applicable to power system stabilizer system for the damping of generator oscillations.

The foregoing and other objects are achieved, in accordance with the invention, by providing a scheme which senses the output voltage and output current of a generator to develop, through the use of a power system stabilizer, an oscillation signal. A third signal, which is a function of the instantaneous terminal voltage of the generator with respect to neutral, is generated and multiplied by the oscillation signal from the PSS to yield a modulation signal which, in turn, is added to a voltage feedback signal to the voltage regulator which, in turn, controls the exciter for generator field winding.

BRIEF DESCRIPTION OF THE DRAWING

While the present invention is defined in particularity in the claims annexed to and forming a part of this specification, a better understanding thereof can be had from the following description taken in conjunction with the accompanying drawing which:

DETAILED DESCRIPTION

Figure 1:
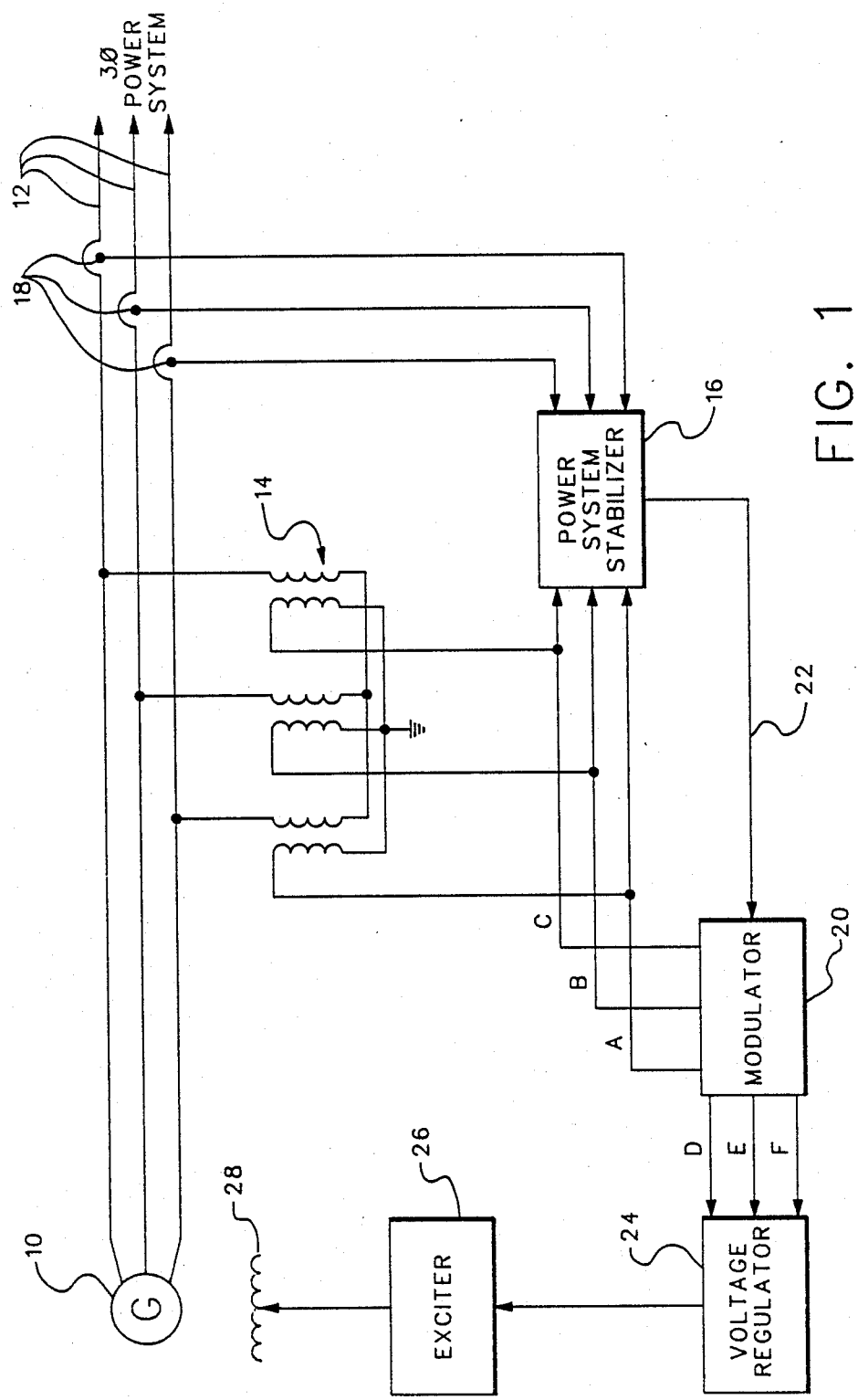
FIG. 1 is a major block diagram illustrating the present invention in its broadest aspects.

Referring now to FIG. 1, there is shown in major block diagram the overall system of the present invention. An ac synchronous generator 10 is connected to the power system as illustrated by lines 12. A potential transformer system, illustrated as a wye connected three phase transformer 14, provides signals proportional to the terminal voltage of the generator to a power system stabilizer 16 of a type known in the art. The voltage signals from the transformer 14 are also applied to modulator 20 of the present invention as illustrated at lines A, B and C.

As shown, the secondaries of the potential transformer 14 have their common point connected to ground. Signals proportional to the terminal output current of the generator 10 are derived by use of suitable current transformers 18. These signals are also provided to power system stabilizer 16.

The output of the modulator is on lines D, E and F. The power system stabilizer 16, in response to the input signals representing generator terminal voltage and terminal current, provides on line 22 an oscillation signal which has an instantaneous value proportional to the oscillations of the generator 10. This signal, via line 22 is applied to the modulator 20 such that the modulator output on lines D, E and F (a control signal) will be the signals on lines A, B and C as modulated by the signal on line 22. Signals from the modulator 20 are applied to a voltage regulator 24 of the customary type, the output of which is applied to an exciter 26 which, in turn, controls the excitation of the generator field winding 28.

Figure 2A:
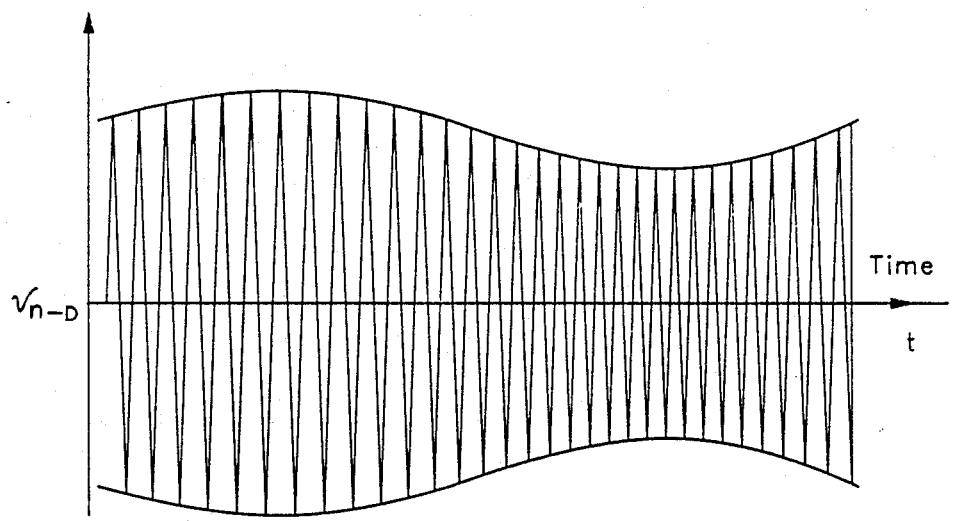
FIGS. 2A and 2B are waveforms drawn to the same time scale useful in understanding the present invention.
Figure 2B:
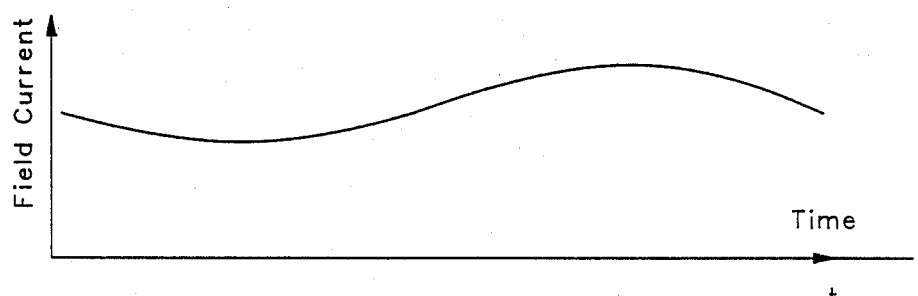

The function of the modulator in this invention is to add to or subtract from (modulate) the generator terminal voltage signals on lines A, B and C, using the PSS output signal, so that the generator excitation current becomes modified in accordance with that latter signal. This is illustrated in FIGS. 2A and 2B. FIG. 2A plots, as a function in time, the oscillations (greatly exaggerated) in voltage magnitude of one neutral to modulator output voltage. FIG. 2B plots, on the same time scale, the field current of the winding 28. It is seen from these two figures that an increase in the output voltage of the modulator causes a corresponding decrease in the field current.

Figure 3:
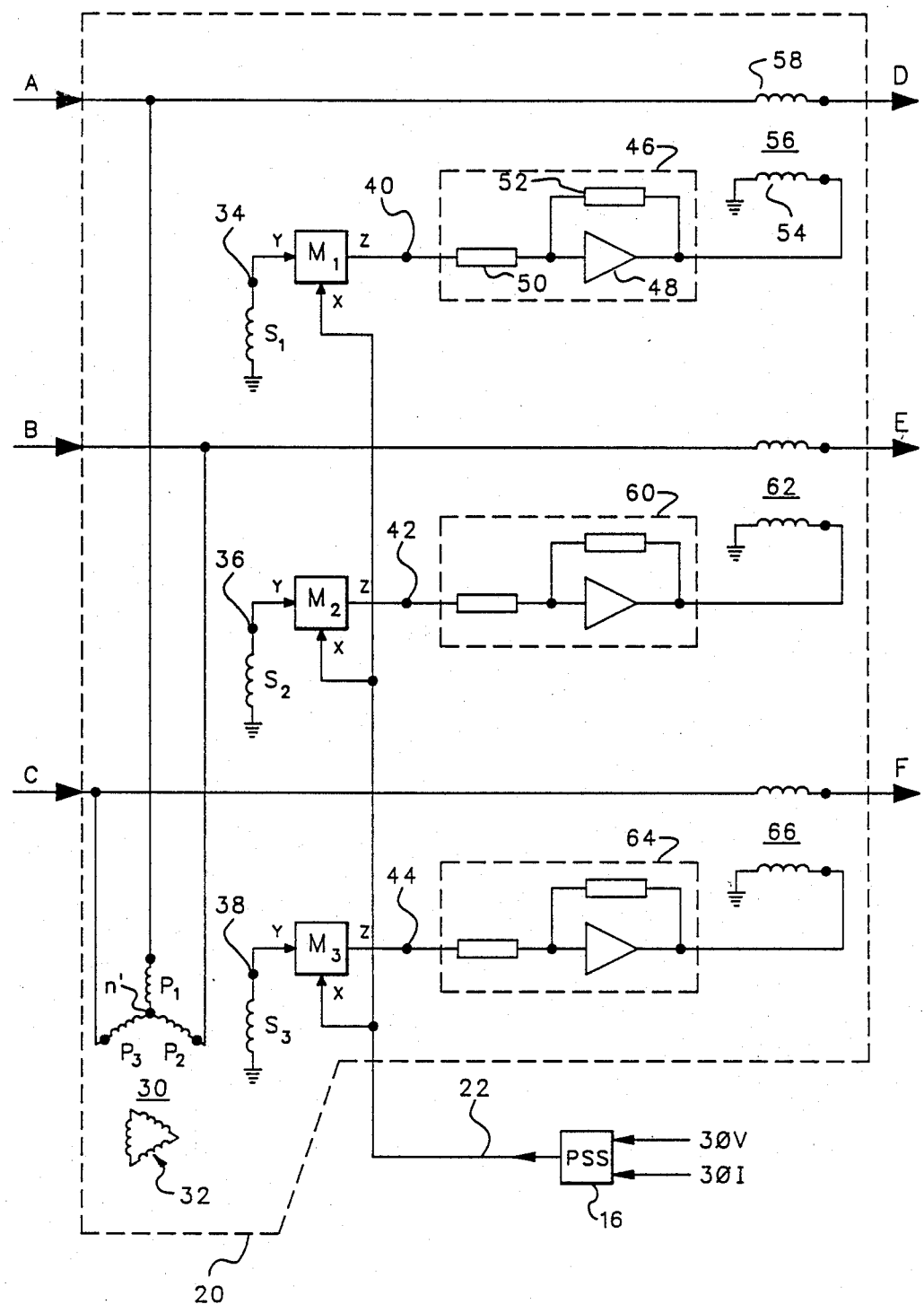
FIG. 3 is a schematic illustration showing the modulator of the present invention in its first embodiment.

Reference is now made to FIG. 3 which illustrates a first embodiment of a modulator of the present invention and demonstrates the method thereof. The modulator of this embodiment is shown within the dashed line 20 and, as points of reference, there are included the three voltage signal lines A, B and C as well as the modulator output lines D, E and F. Also included is the power system stabilizer 16 with its output line 22. Included within the modulator 20 is a transformer, indicated generally at 30, which includes a wye connected primary winding having primary windings $P_1$, $P_2$ and $P_3$ connected, respectively, to the three input lines A, B and C such that the common point n' remains equal to the voltage at the neutral of the applied voltages. Three secondary windings, $S_1$, $S_2$ and $S_3$ are also connected in wye configuration with their common point being ground or neutral. A tertiary winding 32, connected in delta, is provided for the flow of the third harmonic to help establish the neutral point.

In accordance with standard transformer theory, the voltages across the secondary windings $S_1$, $S_2$ and $S_3$, with respect to neutral or ground, as seen, respectively, at nodes 34, 36 and 38 will be equal to the voltages on lines A, B and C (with respect to neutral) times the ratio of the turns of secondary to primary windings. The three voltage signals at 34, 36 and 38 are respectively applied as "y" inputs to three multipliers $M_1$, $M_2$ and $M_3$. The second input (x) to each of the multipliers is the output of the power system stabilizer 16 on line 22. Each of the multipliers $M_1$, $M_2$ and $M_3$ is, preferably, a four quadrant multiplier which means that outputs "z", as seen at respective nodes 40, 42 and 44, are signals having a magnitude which is the product of the inputs to the respective multiplier and a sign according to the relative signs of the inputs.

The signal at node 40 is applied to a linear amplifier 46 which is comprised, in the manner known in the art, of an operational amplifier 48 having input resistor 50 and feedback resistor 52 connected between its output and its input. The output of the linear amplifier 46 is connected to one end of a primary winding 54 of a transformer 56 the other end of which is connected to ground. Transformer 56 further has a secondary 58 connected between the A input and the D output of the modulator 20. From the preceding description it is seen that the voltage induced into the secondary winding 58 will be proportional to the output of the multiplier $M_1$ as adjusted by the proportionality factor of the linear amplifier 46 and the turns ratio of the transformer. Since the secondary winding 58 is in series with the line from input A to the output D, the voltage at output D, with respect to neutral, will be equal to the algebraic sum of the voltage at A and the voltage induced into the secondary winding 58.

In a similar manner, the voltage at node 42 is applied to a linear amplifier 60 the output of which is applied to a transformer 62 in association with input B and output E. The voltage signal at node 44 is applied to a linear amplifier 64 whose output is supplied to a transformer 66 associated with the input C and output F. In accordance with the earlier description of FIG. 1, the signals on lines D, E and F are applied to the voltage regulator 24 which in turn controls exciter 26 and hence the field excitation of the generator in accordance with the teachings of the prior art.

Figure 4:
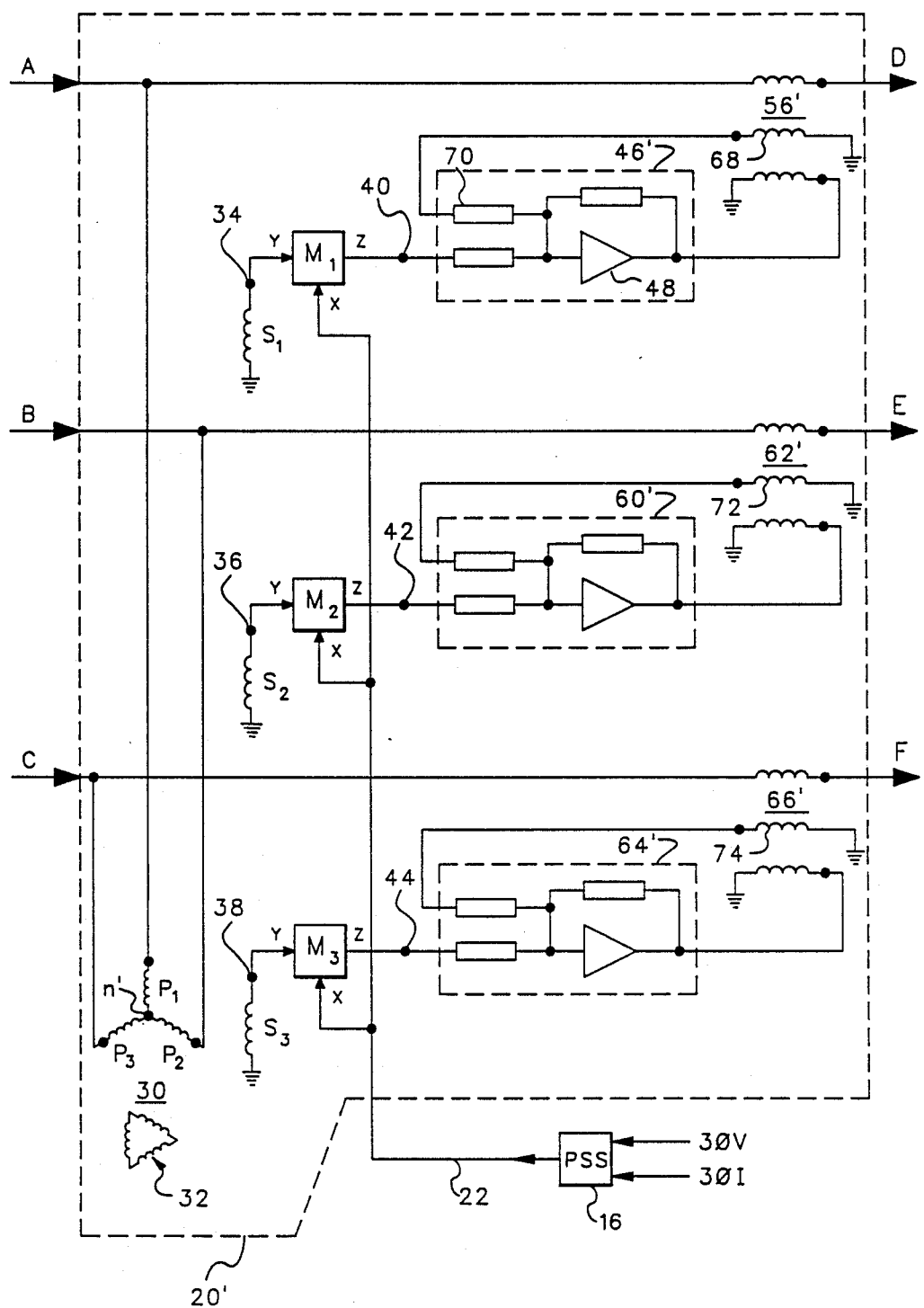
FIG. 4 is a schematic illustration showing a modification of the embodiment of FIG. 3; and, FIG. 5 is a schematic diagram illustrating a third embodiment of the modulator of the present invention.

FIG. 4 illustrates a modification of the modulator of FIG. 3 which is designed to improve the fidelity of the modulation. It is apparent that the only differences over FIG. 3 are the inclusion of a tertiary winding associated with each of the transformers 56', 62' and 66' and a feedback path to the respective operational amplifiers. A tertiary winding 68 associated with transformer 56' is connected between ground and a resistor 70 the other end at which is connected to the input of operational amplifier 48. This arrangement is designed to provide improved fidelity through the inclusion of an inverse feedback. In a similar manner, tertiary windings 72 and 74 are associated respectively with transformers 62' and 66' provide the inverse feedback to the respective amplifiers in the other two phases.

Figure 5:
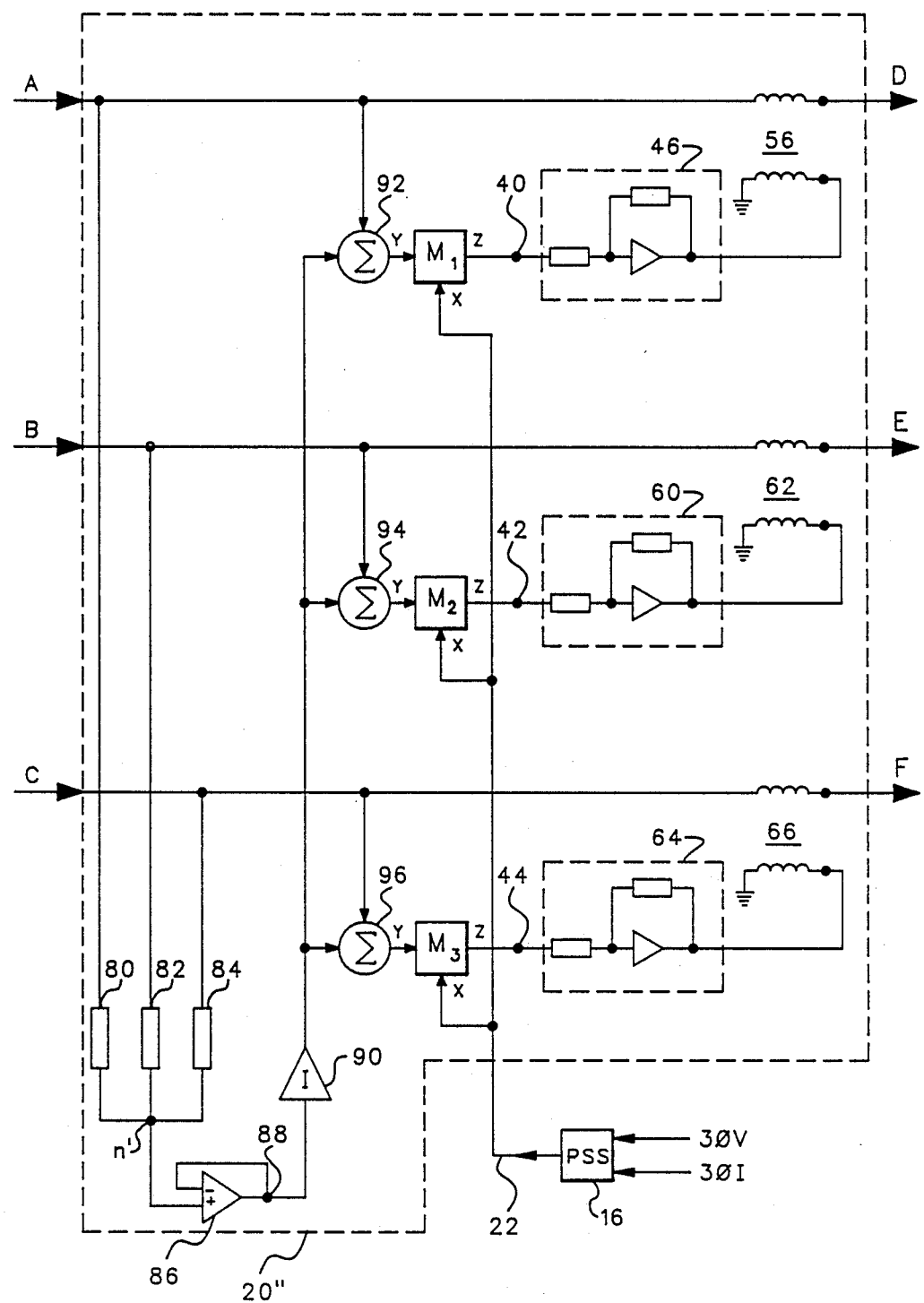

FIG. 5 illustrates an additional embodiment of the method and apparatus of the present invention. It is immediately obvious from the inspection of this figure that the difference between this embodiment and that of FIG. 3 is the manner of developing the line to neutral voltages for application to the several multipliers $M_1$, $M_2$ and $M_3$.

In FIG. 5, the transformers of the earlier embodiments are replaced by a wye connected resistor array comprised of resistors 80, 82 and 84 connected respectively to receive the signals on lines A, B and C. The common point, labeled n', is a neutral point and the signal at that point serves as the input to the positive input of an operational amplifier 86 which has its negative input terminal connected to its output. This results in an isolating voltage follower arrangement such that its output, at node 88, remains at the neutral (n') of the line voltage If required, the signal at node 88 may be applied to an inverter 90, the output of which serves as one input to three summing junctions 92, 94 and 96 which, respectively, have their other inputs connected to the signals on lines A, B and C. The outputs of the three summing junctions 92, 94 and 96 are signals which represent the line to neutral voltages of the three phases of the system and serve as the "y" inputs to the respective multipliers $M_1$, $M_2$ and $M_3$. As before, the other input to each of the multipliers is the output of the PSS 16. In all other respects, this embodiment is the same as that earlier described with respect to FIG. 3. It is, of course, obvious that inverse feedback feature of the FIG. 4 embodiment is also applicable to this embodiment.

Although the only PSS specifically illustrated is one responsive to generator voltage and current, it is recognized that other forms are known. Examples include systems responsive to generator output frequency or responsive to generator speed directly sensed as by a magnetic or optical toothed wheel. In each case, however, the output of the PSS is what is here termed an oscillation signal.

Thus, there have been shown and described a method and apparatus for damping the oscillations at an ac synchronous generator which are readily applicable to a wide variety of systems without the need of entering into the internal electronics or components of the voltage regulator.

While the present invention has been shown and described in its preferred embodiments, modifications thereto will readily occur to those skilled in the art. For example, although the method and apparatus have been described with respect to a three phase system, it is readily apparent that it is applicable to other polyphase systems or to a single phase system. In the latter situation, the line to neutral voltage is derived from the two lines of the single phase system. It is not desired, therefore, that the present invention be limited to the specific embodiments shown and described and it is intended to cover in the appended claims all such modifications as fall within the true scope and spirit of the invention.

What is claimed:

1. A system for stabilizing a synchronous generator, providing an output voltage and an output current, through excitation control to dampen generator oscillations comprising:
   (a) means to develop a first signal representing the output voltage of said generator;
   (b) means to develop second signal representing the output current of said generator;
   (c) means responsive to said first and second signals to develop an oscillation signal representing the instantaneous magnitude of said generator oscillations;
   (d) means to develop a third signal representing an output voltage of said generator with respect to neutral;
   (e) means to multiply said oscillation signal by said third signal to yield a modulation signal; and,
   (f) means responsive to said modulation signal to control the excitation of said generator.

2. The invention in accordance with claim 1 wherein said means to develop said third signal comprises transformer means.

3. The invention in accordance with claim 1 wherein the output voltage of said generator is a three phase voltage and wherein said means to develop said third signal comprises transformer means including:
   (a) a wye connected primary winding; and,
   (b) a wye connected secondary winding having a common point connected to neutral.

4. The invention in accordance with claim 3 wherein said means responsive to said modulation signal includes additional transformer means for modifying said first signal to provide a control signal and voltage regulator means responsive to said control signal for controlling the excitation of said generator.

5. The invention in accordance with claim 4 wherein said additional transformer means includes a primary winding for receiving said modulating signal, a secondary winding associated with said first signal and a tertiary winding for providing an inverse feedback signal.

6. The invention in accordance with claim 1 wherein the output voltage of said generator is a three phase voltage and wherein said means to develop said third signal comprises:
   (a) a plurality of resistors connected in a wye configuration defining a neutral point; and,
   (b) a configuration including an operational amplifier connected to said neutral point for developing said third signal.

7. A system for stabilizing a synchronous generator providing an output voltage and an output current, through excitation control to dampen generator oscillations comprising:
   (a) a power system stabilizer means responsive to the generator operating parameters to develop an oscillation signal having an instantaneous magnitude proportional to said generator oscillations;
   (b) means to develop a voltage signal representing an output voltage of said generator with respect to neutral;
   (c) means to multiply said oscillation signal by said voltage signal to yield a modulation signal; and,
   (d) means responsive to said modulation signal to control the excitation of said generator.

8. The invention in accordance with claim 7 wherein the output voltage of said generator is a three phase voltage and wherein said means to develop said voltage signal comprises transformer means including:
   (a) a wye connected primary winding; and,
   (b) a wye connected secondary winding having a common point connected to neutral.

9. The invention in accordance with claim 8 wherein said means responsive to said modulation signal includes additional transformer means for modifying said first signal to provide a control signal and voltage regulator means responsive to said control signal for controlling the excitation of said generator.

10. The invention in accordance with claim 9 wherein the output voltage of said generator is a three phase voltage and wherein said means to develop said voltage signal comprises:
    (a) a plurality of resistors connected in a wye configuration defining, a neutral point; and,
    (b) a configuration including an operational amplifier connected to said neutral point for developing said voltage signal.

11. The invention in accordance with claim 7 wherein the output voltage of said generator is a three phase voltage and wherein said means to develop said voltage signal comprises:
    (a) a plurality of resistors connected in a wye configuration defining a neutral point; and,
    (b) a configuration including an operational amplifier connected to said neutral point for developing said voltage signal.

12. A system of the type in which a synchronous generator is excitation controlled to dampen generator oscillations through the use of a power system stabilizer which provides an oscillation signal representing the magnitude of instantaneous oscillation of said generator; the improvement comprising:
- (a) means responsive to a voltage output of said generator to develop a voltage signal representing the value of said voltage output with respect to neutral;
- (b) means to multiply said oscillation signal by said voltage signal to yield a modulation signal; and,
- (c) means responsive to said modulation signal to vary the excitation of said generator.

13. The invention in accordance with claim 12 wherein the output voltage of said generator is a three phase voltage and wherein said means to develop said third signal comprises transformer means including:
- (a) a wye connected primary winding; and,
- (b) a wye connected secondary winding having a common point connected to neutral.

14. The invention in accordance with claim 13 wherein said means responsive to said modulation signal includes additional transformer means for modifying said first signal to provide a control signal and voltage regulator means responsive to said control signal for controlling the excitation of said generator.

15. The invention in accordance with claim 14 wherein the output voltage of said generator is a three phase voltage and wherein said means to develop said voltage signal comprises:
- (a) a plurality of resistors connected in a wye configuration defining a neutral point; and,
- (b) a configuration including an operational amplifier connected to said neutral point for developing said voltage signal.

16. The invention in accordance with claim 12 wherein the output voltage of said generator is a three phase voltage and wherein said means to develop said voltage signal comprises:
- (a) a plurality of resistors connected in a wye configuration defining a neutral point; and,
- (b) a configuration including an operational amplifier connected to said neutral point for developing said voltage signal.

17. A method for stabilizing a synchronous generator, which provides an output voltage and an output current, through controlling the excitation of said generator to dampen generator oscillations comprising the steps of:
- (a) developing a first signal representing the output voltage of said generator;
- (b) developing a second signal representing the output current of said generator;
- (c) developing an oscillation signal representing the instantaneous magnitude of said generator oscillation as a function of said first and second signals;
- (d) developing a third signal representing an output voltage of said generator with respect to neutral;
- (e) multiplying said oscillation signal by said third signal to yield a modulation signal; and,
- (f) controlling the excitation of said generator as a function of said modulation signal.

18. The method in accordance with claim 17 wherein said step of controlling the excitation of said generator includes the step of adding said modulation signal to said first signal to yield a control signal for controlling the excitation of said generator.

19. A method for stabilizing a synchronous generator through excitation control to dampen generator oscillations comprising:
- (a) sensing an output voltage and an output current of said generator and developing in response thereto an oscillation signal presenting the instantaneous magnitude of said generator oscillations;
- (b) developing a voltage signal representing an output voltage of said generator with respect to neutral;
- (c) multiplying said oscillation signal by said voltage signal to yield a modulation signal; and,
- (d) developing the excitation of said generator as a function of said modulation signal.

* * * * *